United States Patent Office 3,623,329
Patented Nov. 30, 1971

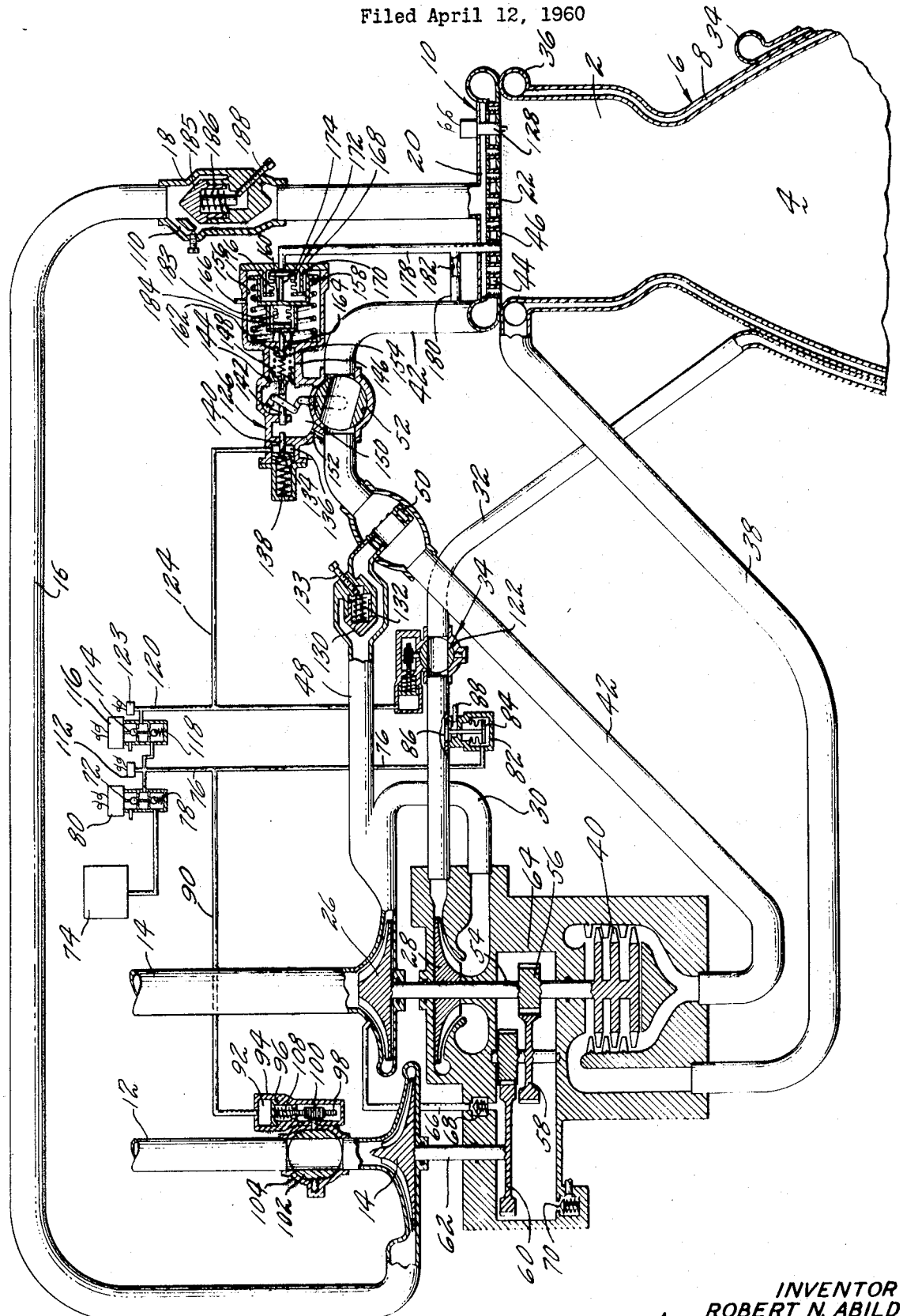

3,623,329
CONTROL SYSTEM FOR LIQUID ROCKET
Robert N. Abild, New Britain, Conn., assignor to United
Aircraft Corporation, East Hartford, Conn.
Filed Apr. 12, 1960, Ser. No. 21,831
Int. Cl. F02k 3/00
U.S. Cl. 60—243                              13 Claims This invention relates to a propellant system for a liquid propellant rocket.

The co-pending application of Ledwith, Ser. No. 21,833, filed Apr. 12, 1960, now Pat. No. 3,028,729, discusses a system in which only a part of one of the propellants being supplied to the rocket is used for cooling the rocket wall and to power the turbine for the propellant pumps.

The remainder of this propellant at a lower pressure is delivered directly to the injector head. One feature of the present invention is an arrangement of valving for a propellant system of this type. Another feature is an arrangement for controlling the flow of the propellant used for cooling the rocket and for driving the turbine.

One feature of the invention is a thrust control valve in the propellant line by which to control the delivery of this propellant to the rocket injector and thus to maintain the desired combustion chamber pressure. Another feature is an arrangement of the valving such that the propellant pump will be submerged during nonoperating intervals so that the pump will be kept at the same temperature as the liquid fuel.

Other features and advantages will be apparent from the specification and claims, and from the accompanying drawing which illustrates an embodiment of the invention.

The single figure is a diagrammatic showing of the propellant system.

The propellant system is shown in connection with a rocket having a combustion chamber 2 and a nozzle 4 communicating therewith, the nozzle and combustion chamber having a cooled wall 6 having passages 8 shown schematically for the flow of coolant therethrough. The rocket also has an injector head 10 forming one wall of the combustion chamber, this head providing the admission of the propellants into the combustion chamber. The particular arrangement of the injector head is not critical; one example of an injector head is shown in the co-pending application of Hasbrouck, Ser. No. 21,832, filed Apr. 12, 1960, now Pat. No. 3,221,499 having the same assignee as this application.

The system shown will be described with the two propellants being an oxidizer and hydrogen, although it will be understood that the device is applicable to other propellants. In any event, one of the propellants will be a cryogenic fuel such as liquid hydrogen.

One propellant, the oxidizer, is supplied by a supply conduit 12 to a pump 14 and thence through a conduit 16 past a valve 18 to the oxidizer manifold 20 in the injector head. From this manifold the oxidizer is schematically shown as passing through ports 22 in the injector head. The pump 14 will deliver the oxidizer at a pressure sufficiently above the combustion chamber pressure to assure the desired flow of the oxidizer into the combustion chamber.

The other propellant, hydrogen, is delivered by a supply conduit 24 to the first-stage pump 26 of a two-stage pump, the high-pressure pump 28 being the second stage of the pump. From the low pressure stage a part of the hydrogen is delivered through a conduit 30 to the inlet of the high pressure pump 28 and a conduit 32 delivers hydrogen under pressure from the high pressure pump 28 to a manifold 33 communicating with the cooling passages 8. This conduit 32 has a shutoff valve 34 therein which will be described in detail later.

From the cooling passage 8 in the nozzle wall, a collecting manifold 36 communicating with these passages delivers the hydrogen through a delivery conduit 38 to a turbine 40 which drives the pumps 14, 26 and 28. The discharge of the turbine 40 passes through a conduit 42 to the hydrogen manifold 44 in the injector head. From this manifold the hydrogen escapes through, for example, orifices 45 in a plate 46 into the combustion chamber.

As above stated, a part only of the fuel from the low pressure pump 26 is delivered to the high pressure pump. The remainder of this fuel hydrogen goes from the low pressure pump through a conduit 48 to a flow mixer 50 where it joins the hydrogen in the conduit 42. This flow mixer 50 is upstream of the shutoff valve 52 in the conduit 42.

The turbine drive for the pumps is shown and described in the co-pending application of Lattanzio et al., Ser. No. 21,829, filed Apr. 12, 1960, now abandoned. For the purpose of this application, it is sufficient to note that the rotors for the pumps 26 and 28 are mounted on the same shaft 54 as the turbine rotor and this shaft 54 carries a gear 56 meshing with a reduction gear system 58 which in turn drives a gear 60 on the shaft 62 for the pump 14. The gearing just described is enclosed within a casing 64 to which hydrogen at a low pressure from the low pressure pump 26 is delivered through a conduit 66 past a check valve 68. The hydrogen excludes oxygen from the gearing thereby preventing oxidation of these gears and being at a low temperature it cools the gears to remove frictional heat so that the gears can operate under a much heavier load than otherwise. A check valve 70 limits the escape of hydrogen from the casing 64.

The control system for the rocket is started either manually or automatically by energizing solenoid 80 to cause opening of a prestart valve 72 which admits helium from a pressure source 74 to a prestart conduit 76. The valve 72, shown in the open position, is normally held closed by a spring 78 and is opened by energizing the solenoid 80. Helium in the conduit 76 opens an overboard drain valve 82 for the escape of any vapor within the conduit 32 to which the valve 82 is connected. Admission of pressure to the space 84 in the valve 82 moves the valve element 86 upwardly to open the vent 88, as will be apparent. Increase in pressure in conduit 32 as the pump 28 approaches normal operating speed causes valve element 86 to close, stopping further drainage at this point.

A branch conduit 90 admits helium under pressure to a chamber 92 in a housing 94 in which a piston 96 is slidable. The piston carries a rack 98 meshing with a gear 100 on a ball valve 102 in a valve casing 104. The valve 102 is in the supply conduit 12 to the pump 14 and the helium under pressure moves the valve into the open position shown against the pressure of a spring 108. This allows oxygen to flow from the tank through a conduit 16 to the valve 18. This valve incorporates a small bypass 110 which permits a small amount of oxidizer to flow to the injector head and thence into the combustion chamber. The conduit 76 also carries a pressure switch 112 to indicate when the helium pressure in the conduit 76 has reached the necessary operating pressure, this switch being connected to any suitable indicator.

The next step in starting the system is to open the start valve 114 which is done by actuating the solenoid 116 through an automatic or manual switching system, not shown, thereby moving the valve 114 against the spring 118 into the position shown. This admits helium under pressure to a conduit 120 to move the valve element 122 of the valve 34 in the same manner as the valve element 102 is moved. This opens the conduit 32 for the flow of hydrogen from the high pressure pump through the nozzle passages 8 and thence to the turbine 40. A pressure switch 123 indicates when the necessary helium pressure exists in conduit 120.

A branch conduit 124 for helium from the conduit 120 also admits helium to the valve actuator 126 for the valve 52 resulting in moving this valve into the open position so that a flow of fluid from the turbine through the conduit 42 into the combustion chamber may take place. The actuator 126 will be described in detail later.

Before the system is put in operation, it will be understood that the nozzle and piping from the valve 34 and through the turbine is at ambient temperature so that as the valve element 122 is moved into open position and hydrogen flows by gravity through the nozzle walls, this hydrogen will be heated up and vaporized to provide energy for starting the turbine 40 and this vapor continues through the conduit 42 into the combustion chamber. The mixture of hydrogen and oxidizer in the combustion chamber is ignited by a suitable ignitor 128 of conventional construction and as combustion begins the combustion chamber and nozzle wall is additionally heated to increase the energy available for the turbine and thereby to increase the speed of the propellant pumps until normal operation occurs.

The conduit 48 has a pressure responsive valve therein which includes a movable valve element 130 urged into the closed position by a spring 132 but moved into the open position shown in the drawing by the pressure in the conduit 48 as the pump 26 develops the normal pressure for that pump. The valve element 130 remains in open position shown, as limited by a stop 133, so long as the fuel system is in normal operation. Thus, during normal operation a selected portion of the fuel from the low pressure pump 26 goes directly through conduit 48 to the fuel mixer 50 and thence to the injector head. The remainder of the cryogenic fuel is directed to the high pressure pump stage 28 to circulate through nozzle wall and thence past the turbine.

The valve 52 is a thrust control and shutoff valve. As above stated, the valve is moved into the part-open position shown by the admission of helium to the casing 126. One way by which this is accomplished is to provide a plunger 134 slidable in a bore 136 in the casing 126 and urged to the right by a spring 138. When helium is admitted to the right-hand end of the bore 136, the piston 134 is withdrawn to the left to the position shown thereby withdrawing the stem 140 out of engagement with the end of a plunger 142. The latter carries a piston 144 slidable in a bore 146 in the casing 126. A passage 148 through the piston permits a restricted flow of hydrogen under pressure from the space 150 within the casing into the bore 146 to the right of the piston. The space 150 is maintained at the pressure of the hydrogen upstream of the valve 52 by a passage 152 in the valve which provides a fluid connection between the conduit 42 and the space 150. A spring 154 acting on the piston 144 urges the piston to the left in a direction to open the valve 52.

The casing 126 has another bore 156 in which is positioned a spring 158 acting on a disc 160 to move the latter to the right. This disc carries a projecting valve 162 in a position to engage a valve seat 164 at the end of the bore 146 such that this valve bleeds pressure from the bore 146 into the bore 156 and thence through the vent 166. The end cap 168 on the casing 126 has an integral sleeve 170 to which is connected a bellows 172. The other end of the bellows is connected to a central stem 174 on the disc 160. The bellows and the sleeve 170 define a chamber 176 which communicates through a conduit 178 with the combustion chamber. A bleed passage 180 from the conduit 42 to the conduit 178 with an orifice 182 therein maintains hydrogen vapor within the conduit 178 and preventing the entrance of combustion products from chamber 2 into conduit 178. Another bellows 183 having the same effective piston area as bellows 172 is attached to the left side of disc 160 as well as to bracket 184 fastened rigidly to casing 126. This second bellows 183 is evacuated to serve as a reference pressure for that in chamber 176.

As the pressure increases within the combustion chambers, this pressure being communicated to chamber 176, causes the disc 160 to move to the left thereby increasing the rate of flow of fluid from the bore 146 thereby lowering this pressure as compared to the pressure in the chamber 150 so that the piston 144 is moved to the right against the spring 154 causing the valve 52 to move toward closed position. Conversely, a decrease in combustion chamber pressure will cause the valve 162 to move to a closed position thereby causing the valve 52 to open more and increase the flow of propellant to the combustion chamber to restore the desired combustion chamber pressure.

The valve 18 which serves as a mixture ratio and control valve is the subject matter of a co-pending application of Abild, Ser. No. 22,363, filed Apr. 14, 1960, now abandoned. For the purpose of the present invention, this valve is shown as a pressure sensitive valve having a movable valve element 185 urged into closed position by a spring 186 and moved to the open position shown by oxidizer pressure upstream of this valve in the conduit 16. A suitable stop 188 limits the open position of this valve.

It is to be understood that the invention is not limited to the specific embodiment herein illustrated and described, but may be used in other ways without departure from its spirit as defined by the following claims.

I claim:

1. In a fuel system for a rocket having an injector and a wall having cooling passages therein, a source of cryogenic fuel, a multistage pump having a low pressure stage and a high pressure stage for delivering the fuel under pressure, a conduit from the low pressure stage to the injector head, a pressure responsive valve in said conduit, a conduit from the high pressure stage to the cooling passages, a shutoff valve in said conduit, a turbine driving said pump stages and a conduit from the cooling passages to the turbine and from the turbine to the injector.

2. A fuel system as in claim 1 in which the pressure responsive valve is normally closed so that with the rocket inoperative the pumps for the fuel are submerged in the fuel.

3. A fuel system as in claim 1 in which a conduit directs a part of the output of the low pressure stage to the inlet of the high pressure stage.

4. A fuel system as in claim 1 in which the pressure responsive valve is normally closed and is opened by pressure upstream of said valve.

5. A fuel system as in claim 1 in which the shutoff valve is normally closed and is opened to put the fuel system in operation.

6. A fuel system as in claim 1 in which a vent valve is positioned upstream of the shutoff valve, the vent valve being closed by pressure within the conduit from the high pressure stage to the shutoff valve.

7. A fuel system as in claim 1 in which the conduit from the low pressure stage to the injector and from the turbine to the injector merge upstream of the injector.

8. A fuel system as in claim 7 in which a mixer provides for the mixing of the fuel in the merged conduits.

9. In a fuel system for a rocket having an injector and a wall having cooling passages therein, a source of fuel, a multistage pump having a low pressure stage and a high pressure stage for delivering the fuel under pressure, a conduit from the low pressure stage to the injector, a conduit from the high pressure stage to the cooling passages, a turbine driving said pump stages, a conduit from the cooling passages to the turbine and from the turbine to the injector, the conduit from the low pressure stage to the injector and the conduit from the turbine merging before they reach the injector.

10. A fuel system as in claim 9 in which a mixer is provided in the merged conduits for combining the flows in said conduits.

11. A system as in claim 8 in which a thrust control valve is provided for the merged conduits upstream of the injector.

12. A system as in claim 11 in which the thrust control valve is responsive to combustion chamber pressure for controlling the flow through said valve to the injector.

13. A system as in claim 11 in which the thrust control valve is responsive to combustion chamber pressure and to propellant pressure upstream of the thrust control valve for adjusting the flow to the injector.

References Cited

UNITED STATES PATENTS

| | | | |
|---|---|---|---|
| 2,586,025 | 2/1952 | Godfrey | 60—35.6 |
| 2,754,655 | 7/1956 | Holwarth | 60—35.6 |
| 2,814,929 | 12/1957 | Morley et al. | 60—35.6 |
| 2,930,187 | 3/1960 | Chillson et al. | 60—35.6 |

FOREIGN PATENTS

| | | | |
|---|---|---|---|
| 702,779 | 1/1956 | Great Britain | 60—35.6 |

SAMUEL FEINBERG, Primary Examiner

U.S. Cl. X.R.

60—259, 267